(12) United States Patent
Jonnalagadda et al.

(10) Patent No.: US 7,887,234 B2
(45) Date of Patent: Feb. 15, 2011

(54) MAXIMUM BLADE SURFACE TEMPERATURE ESTIMATION FOR ADVANCED STATIONARY GAS TURBINES IN NEAR-INFRARED (WITH REFLECTION)

(75) Inventors: Vinay Jonnalagadda, Oviedo, FL (US); Dennis H. Lemieux, Casselberry, FL (US); Visvanathan Ramesh, Plainsboro, NJ (US); Matthias Voigt, Lawrenceville, NJ (US)

(73) Assignees: Siemens Corporation, Iselin, NJ (US); Siemens Energy, Inc., Orlando, FL (US)

( * ) Notice: Subject to any disclaimer, the term of this patent is extended or adjusted under 35 U.S.C. 154(b) by 354 days.

(21) Appl. No.: 11/872,758

(22) Filed: Oct. 16, 2007

(65) Prior Publication Data

US 2008/0095212 A1    Apr. 24, 2008

Related U.S. Application Data

(60) Provisional application No. 60/853,484, filed on Oct. 20, 2006.

(51) Int. Cl.
*G01J 5/00* (2006.01)
*G01K 13/08* (2006.01)
*G01N 21/00* (2006.01)

(52) U.S. Cl. .................. 374/124; 250/338.1; 374/1; 374/141; 374/144

(58) Field of Classification Search .............. 374/4, 374/5, 6, 7, 57, 101, 102, 120, 121, 124, 374/129, 134, 141, 144, 1, 2, 100; 250/338.1, 250/338.3, 341.7, 339.01, 339.11, 339.14, 250/358.1, 363.1, 363.09, 559.05, 559.43, 250/559.45, 559.46, 472.1; 382/140, 276, 382/312, 100
See application file for complete search history.

(56) References Cited

U.S. PATENT DOCUMENTS 5,287,183 A * 2/1994 Thomas et al. .............. 348/571

(Continued)

FOREIGN PATENT DOCUMENTS

GB          2164147 A  *  3/1986

(Continued)

OTHER PUBLICATIONS

Riggan P J et al: "Field applications of a multi-spectral, thermal imaging radiometer" Aerospace Conference, 1999, Proceedings, 1999 IEEE Snowmass At Aspen Co, USA Mar. 6-13, 1999, Piscataway, NJ USA, IEEE, US, vol. 3, Mar. 6, 1999, pp. 443-449, XP010350191, ISBN:0-7803-5425-7 Bastract p. 444, col. 1, Paragraph 4—p. 445, col. 2, Paragraph 1.

(Continued)

*Primary Examiner*—Gail Verbitsky
(74) *Attorney, Agent, or Firm*—Donald B. Paschburg

(57) ABSTRACT

Methods for maximum scene surface temperature estimation for blades with reflective surface properties in advanced stationary gas turbines are disclosed. The approach utilizes high speed infrared imagery provided by an online monitor system using a focal plan array (FPA) for near-infrared monitoring during engine runtime up to base load. The one waveband method for temperature estimation is assumed as starting point. A lower surface emissivity and higher surface reflectance of thermal barrier coating (TBC) in near-infrared can cause systematic estimation errors. Methods using the one wave band method, with the purpose to reduce estimation errors for maximum temperatures are also disclosed. Theoretical results, data from numerical simulations, and real data from engine test are provided. A system for performing temperature estimation methods is also disclosed.

10 Claims, 7 Drawing Sheets

U.S. PATENT DOCUMENTS

| | | | |
|---|---|---|---|
| 5,838,588 A * | 11/1998 | Santoso et al. | 700/287 |
| 6,364,524 B1 * | 4/2002 | Markham | 374/131 |
| 6,422,743 B1 * | 7/2002 | Nirmalan et al. | 374/43 |
| 6,690,016 B1 * | 2/2004 | Watkins et al. | 250/341.7 |
| 6,751,342 B2 * | 6/2004 | Shepard | 382/141 |
| 7,251,345 B1 * | 7/2007 | Han | 382/103 |
| 7,561,188 B2 * | 7/2009 | Kondo et al. | 348/222.1 |
| 7,633,513 B2 * | 12/2009 | Kondo et al. | 345/633 |
| 2005/0063450 A1 * | 3/2005 | Willsch et al. | 374/57 |
| 2006/0217857 A1 * | 9/2006 | Yoshida et al. | 701/31 |
| 2006/0256226 A1 * | 11/2006 | Alon et al. | 348/335 |
| 2006/0281777 A1 | 12/2006 | Ahmad et al. | |
| 2008/0095212 A1 * | 4/2008 | Jonnalagadda et al. | 374/124 |
| 2008/0175478 A1 * | 7/2008 | Wentland et al. | 382/181 |
| 2008/0179520 A1 * | 7/2008 | Kauffman et al. | 250/332 |
| 2009/0051760 A1 * | 2/2009 | Ottney | 348/53 |
| 2009/0079854 A1 * | 3/2009 | Mangoubi et al. | 348/251 |

FOREIGN PATENT DOCUMENTS

| | | | |
|---|---|---|---|
| JP | 61172059 A | * | 8/1986 |
| JP | 02298830 A | * | 12/1990 |
| WO | WO 2005/015143 A | | 2/2005 |

OTHER PUBLICATIONS

Riggan P J et al:: "Firemappertm: A Thermal-Imaging Radiometer for Wildlife Research and Operations" Aeorspace Conference, 2003, Proceedings, 2003 IEEEMar. 8-15, 2003, Piscataway, NJ USA, IEEE, vol. 4, Mar. 8, 2003, pp. 41843-41854, XP010660410, ISBN: 0-7803-7651-X, p. 2, col. 2, Paragraph 2—p. 3, col. 2, Paragraph 1.

Beyton T G R: Turbine, Pyrometry—An Equiptment Manufacturer's View ASME PAP, 1981, XP009099101 p. 2, col. 1, Paragraph 5-p. 3, col. 1, Paragraph 6.

Schulenberg T; Bals H: "Blade Temperature Measurements of Model V84. 2 100 MW/60 Hz Gas Turbine" Papers Presented at the ASME Gas Turbine Conference and Exhibition.; Anaheim CA USA 1987, XP009099099 USA p. 4, col. 1, Paragraph 3—p. 5, col. 1, Paragraph 3.

Dennis Lemieux et al. Technical report: TR-05178 at Siemens Power Generation, 2005, Orlando, Florida.

M. Voigt, M. Zarzycki, D. Lemieux, V. Ramesh, "Scene-based nonuniformity correction for focal plane arrays using a facet model", Proceedings of the SPIE Infrared Technology and Applications XXXI, vol. 5784, pp. 331-342 (2005).

J. Markham, H. Latvakoski, D. Marran, J. Neira, P. Kenny, P. Best "Challenges of Radiation Thermometry for Advanced Turbine Engines" Proceedings of the 46th International Instrumentation Symposium, ISA vol. 397, 2000.

Beynon, T.G.R., 1981, "Turbine Pyrometry an Equipment Manufacturer's View" SME 81-GT-136.

* cited by examiner

US 7,887,234 B2

MAXIMUM BLADE SURFACE TEMPERATURE ESTIMATION FOR ADVANCED STATIONARY GAS TURBINES IN NEAR-INFRARED (WITH REFLECTION)

CROSS-REFERENCE TO RELATED APPLICATIONS

This application claims the benefit of U.S. Provisional Application No. 60/853,484, filed Oct. 20, 2006, which is incorporated herein by reference.

BACKGROUND OF THE INVENTION

The present invention relates to surface temperature estimation for blades with reflective surface properties in advanced stationary gas turbines. More specifically it relates to one waveband temperature estimation by high speed imagery for near-infrared radiation.

High speed infrared imagery provided by an online monitor system using a focal plan array (FPA) for near-infrared monitoring can be used during engine runtime up to base load for temperature estimation of turbine blades with reflective surface properties. The one waveband method for temperature estimation may be assumed as starting point. However, a lower surface emissivity and higher surface reflectance of thermal barrier coatings (TBC) in near-infrared can cause systematic estimation errors.

Accordingly, new and improved one waveband near-infrared imagery related methods and systems are required for temperature estimation that will reduce estimation errors.

SUMMARY OF THE INVENTION

The present invention provides improved temperature estimation for gas turbines and other bodies.

In accordance with one aspect of the present invention, a method for one waveband maximum scene temperature estimation from radiated heat from a surface of a body by a radiation sensor, comprising: receiving an image with the sensor; creating a non-uniformity corrected (NUC) image having a plurality of pixels from the image, a pixel having a pixel value; creating a direct one waveband temperature inverse calibration correspondence related to reflected radiation; and transforming the pixel value into an estimated temperature value by using the direct one wave band temperature inverse calibration correspondence.

In accordance with further aspects of the present invention, the method also includes performing a false color transformation.

In accordance with another aspect of the present invention the body can be a part the hot gas path of a gas turbine with reflective surface properties.

In accordance with further aspects of the present invention, observed radiation by the sensor can be expressed by:

$$E = \int_{\lambda=900\,nm}^{\lambda=1700\,nm} S(\lambda)\varepsilon(\lambda)B(T,\lambda)d\lambda + \int_{\lambda=900\,nm}^{\lambda=1700\,nm} S(\lambda)(1-\varepsilon(\lambda))\frac{g\varepsilon(\lambda)}{1-g(1-\varepsilon(\lambda))}B(T_0,\lambda)d\lambda.$$

In accordance with another aspect of the present invention the waveband of wavelengths $\lambda 1$ to $\lambda 2$ can be within the waveband of infrared radiation.

In accordance with further aspects of the present invention, $\lambda 1$ is essentially 900 nm and $\lambda 2$ is essentially 1700 nm.

In accordance with further aspects of the present invention, the method comprises deriving the inverse calibration correspondence by representing an estimated temperature as a function of a pixel value.

In accordance with another aspect of the present invention, the inverse calibration correspondence for temperature estimation is based on a grey body radiation model with $\varepsilon<1$.

In accordance with further aspects of the present invention, the inverse calibration correspondence is corrected for an applied radiation model.

In accordance with another aspect of the present invention, the pixel value is determined by a first term summed with a corrective term depending from reflective radiation.

The present invention also provides a system that performs steps including the steps just described. The system can include: an infrared imagery monitor system that can provide images, a processor, and software operable on the processor to perform the previously described steps.

DESCRIPTION OF A PREFERRED EMBODIMENT

Figure 1:
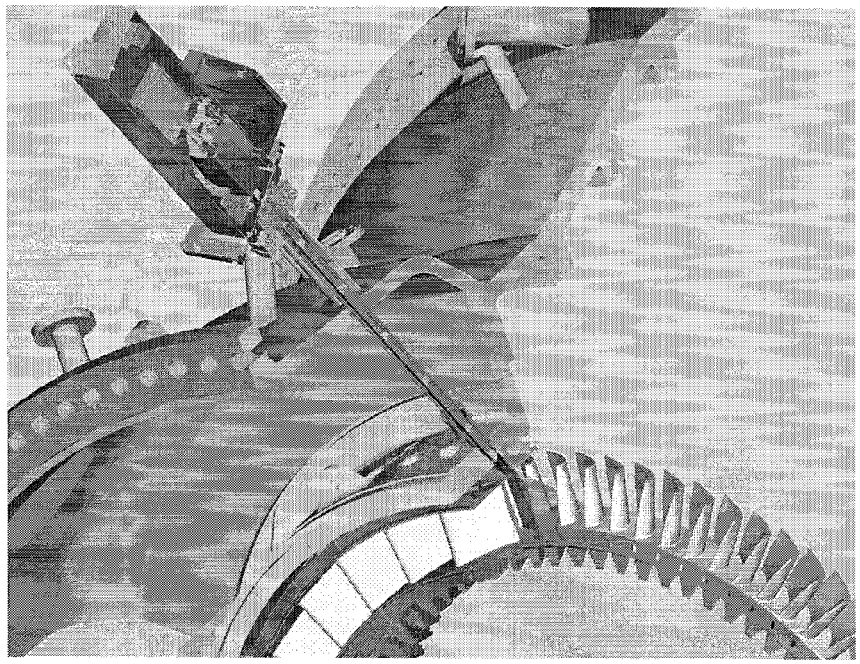
FIG. 1 illustrates a blade monitoring system in a gas turbine engine.

A method for maximum gas turbine TBC blade surface temperature estimation that is an aspect of the present invention includes utilizing an existing online infrared blade monitor system (OLM) as illustrated in FIG. 1. The online monitoring system has the capability to acquire infrared images of individual blades during engine operation. Blades are exposed to the hot gas path with temperatures of approximately 1400° C. and a pressure of 15 bars. Blade rotation of 3000 or 3600 rpm causes a blade tip speed of about 390 m/s.

Figure 2:
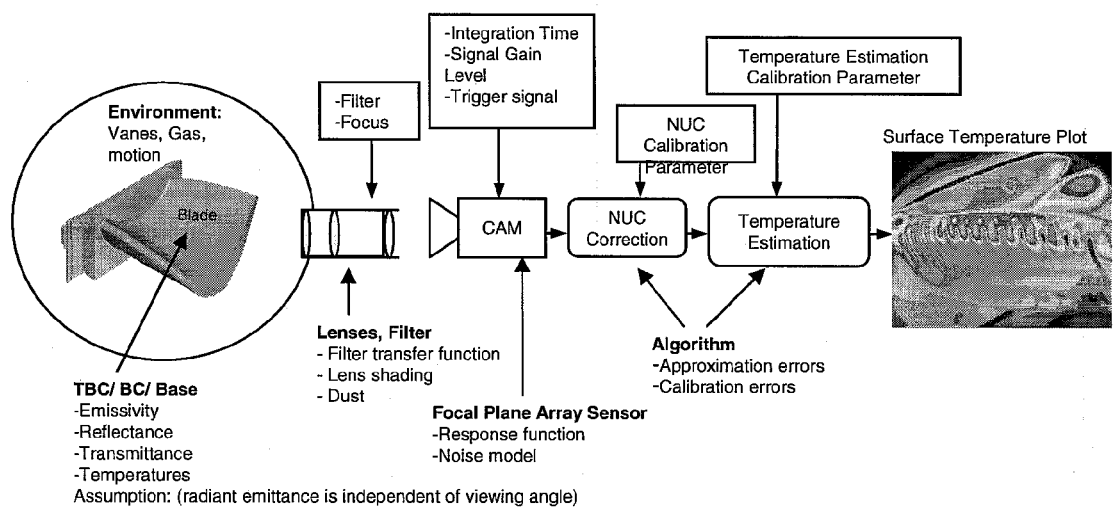
FIG. 2 illustrates a signal path in accordance with an aspect of the present invention.

FIG. 1 shows the installation of the Blade Monitoring System in an SGT6-5000F test engine. Infrared radiation from a blade surface is transmitted by the lens tube 101 to the FPA sensor 102 located in the camera enclosure 103. The online monitor system uses a lens tube, a port window, an alignment stage, a focus lens and filters to project radiant power from the blade surface to the focal plain array sensor located in the cooled camera enclosure. The sensor gate time is sufficient short, between 1-3 µs to avoid motion blur caused by the high blade velocity. The signal path for the blade temperature estimation and relevant system parameter are shown in FIG. 2. FIG. 2 shows the signal path and characteristic parameter relevant for temperature estimation.

Several factors such as surface reflection, absorption, gas emittance, lens attenuation, lens shading, sensor drift, numerical approximations or other effects can have an impact on the accuracy of the temperature estimation. Systematic temperature estimation errors can be expected, if for example emissivity changes or reflected radiation are not taken into account. Relevant for blade surface temperature estimation are two surface materials thermal barrier coating (TBC) and base material. It is known that the emissivity, reflectance and transmittance of TBC can change as a function of wavelength, temperature and age. Uncoated blades have different surface properties than coated blades. It is possible, that surface properties can also change due to deposits on the blade.

The radiated power from the blade is in general a mixture of emitted, reflected and transmitted components. Hot gasses between the blade surface and the lens tube can absorb and emit radiation. Water condensation or deposits on the lens surface, lens shading or limited lens collection, absorption, reflection, or optical filters will cause signal loss and eventually scatter radiation. The InGaAs focal plane array has a specific spectral sensitivity in the near infrared domain from 0.9 µm to 1.6 µm and can collect radiant power within this range. The electric signal generated from the collected charge at each sensor element is also a function of camera parameter. The signal can be distorted by sensor noise and spatial non-uniformities.

Summary of some effects which may compromise temperature estimation:
  Uncertainty of target emissivity (due to deposits, aging, sensitive to temperature and wavelength)
  Reflected radiation from surrounding
  Transmitted radiation from bond coat
  Emission or absorption form sight hot gas path
  Deposits on lens surface
  Lens shading
  Sensor sensitivity and sensor noise at 1-3 µs integration time Direct One Wave Band Blade Surface Temperature Estimation The direct one wave band blade surface temperature estimation method is based on the relationship between blade surface temperature and emitted radiant power as described by the Planck law.

$$\text{Planck}(\lambda) = \frac{c_1}{\lambda^5} \frac{1}{\exp(c_2/\lambda T) - 1} \quad (2\text{-}1)$$

wherein:
Planck($\lambda$)—Spectral radiant emittance, W cm$^{-2}$ mu$^{-1}$
$\lambda$—Wavelength
$c_1 = 2\pi h c_2 = 3.7414E4$—First radiation constant
$c_2 = ch/k = 1.43879E4$—Second radiation constant
T—Absolute material temperature in K
$\epsilon_\lambda$—Spectral material emissivity It is assumed, that the thermal emitted radiant power is a function of the surface temperature T and surface emissivity $\epsilon$. A lens aimed at the target from distance d with a spectral transfer characteristic Lens($\lambda$, d) collects and projects radiation from the target onto the FPA sensor array. Each sensor element on the array can accumulate incident radiation depending on the sensor spectral sensitivity Sensor ($\lambda$) for a given integration time $\Delta t$. The accumulated charge at each sensor element is then amplified and converted to a digital representation described by the camera response function Cam( ).

$$\text{PixelValue} = \text{Cam}\left(\int^{+\Delta t} \int_{\lambda=900nm}^{\lambda=1700nm} \text{Sensor}(\lambda)\text{Lens}(\lambda, d)\text{Planck}(T, \lambda)\epsilon d\lambda dt\right) \quad (2\text{-}2)$$

The direct one waveband temperature estimation method assumes that the relationship between surface temperature T and sensor PixelValue, equation (2-2) can be recorded experimentally and inverted. In praxis the temperature estimation sensor system is calibrated prior to the test by recording the relationship between TBC surface temperature and observed pixel count value from the sensor using a TBC sample in an oven with controlled temperature. It is important that the calibration setup, setup geometry, the lens system, camera settings and filters are in principal identical to the test setup.

Figure 3:
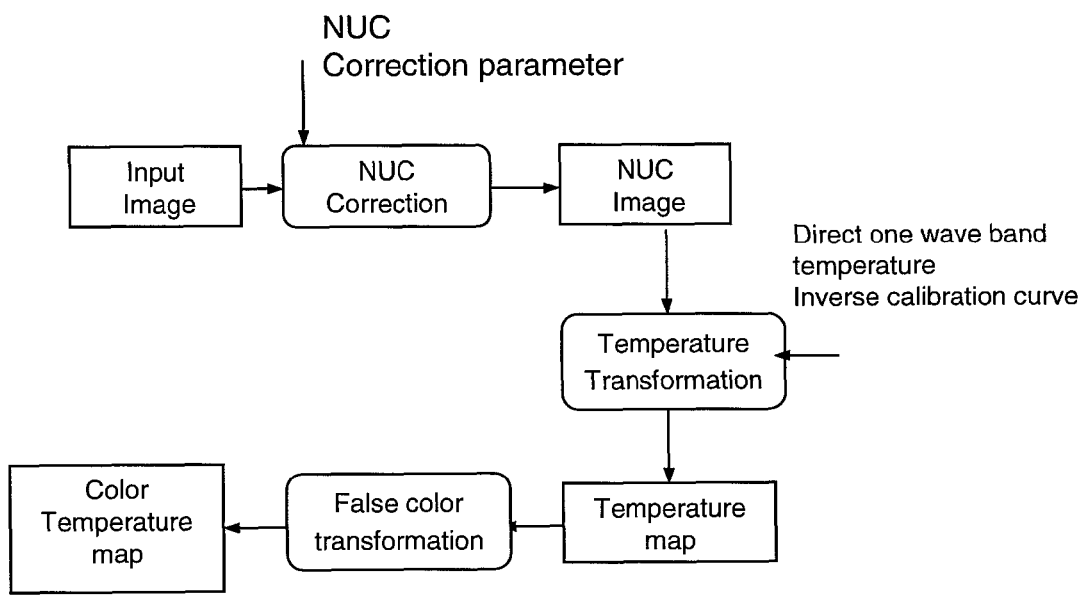
FIG. 3 is a block diagram for direct one waveband temperature estimation in accordance with an aspect of the present invention.

During test, once a new image of the scene is acquired, the inverse correspondence is used to retrieve surface temperatures from sensor pixel count values. A block diagram of the direct one waveband method is shown in FIG. 3. FIG. 3 shows a block diagram for direct one wave band temperature estimation: An input image is first corrected to remove spatial image non-uniformities. Methods for correcting the input image for non-uniformities have been disclosed in U.S. patent application Ser. No. 11/122,568 filed May 5, 2005 which is incorporated herein by reference. The result is a non-uniformity corrected (NUC) image. A NUC image is then transformed to a temperature map by using an inverse calibration curve. The temperature map can then be transformed to a false color temperature representation for better visualization.

It is assumed in this process that the hardware setup between calibration and test are in principal identical and the target emissivity does not change over time. Signal distortions due to additional reflected or transmitted signals are not explicit taken into account. It is important that sensor parameters remain identical between calibration and measurement.

The relationship between surface temperature and pixel response values is recorded in two transformations. The first transformation is a sensor specific non-uniformity correction (NUC). The purpose of the NUC is to reduce variations between sensor elements (pixels). These variations can include pixel dependent non-uniformities caused by the sensor array or spatial non-uniform lens attenuation. The lens correction is for example one spatial non-uniform lens shading effect.

The NUC transformation requires and individual transformation for each sensor element on the FPA. Individual NUC functions for sensors elements (x,y) on the focal plain array (FPA) are represented by lower order polynomials:

$$NUC(x, y, I(x, y)) \approx \sum_{k=0}^{n} b_k(x, y) I^k(x, y) \quad (2\text{-}3)$$

Figure 4:
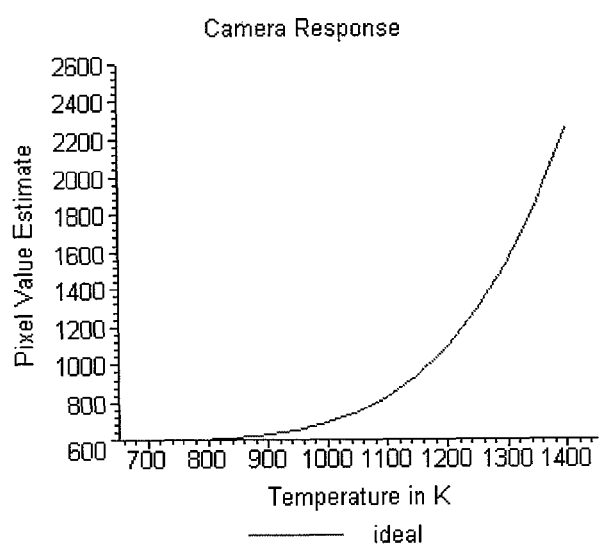
FIG. 4 is a graph illustrating a simulated mean camera response in accordance with an aspect of the present invention.
Figure 5:
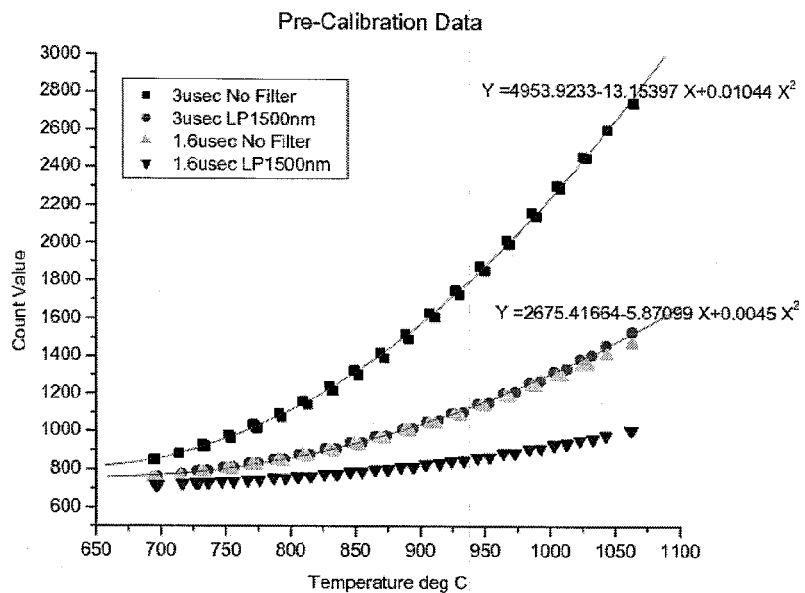
FIG. 5 is a graph illustrating measured mean camera responses in accordance with an aspect of the present invention.

The estimation of the numerous parameters $b_k(x,y)$ is the result of an offline camera NUC calibration procedure using an integrating sphere or an online scene based NUC calibration using online data. The main purpose of the NUC transformation is to remove fixed pattern noise from the image. After the systematic spatial image non-uniformities are removed the remaining signal can be transformed to temperature values. A theoretical and experimental curve of the relationship between TBC surface temperature and corrected camera pixel count values are shown in FIG. 4 and FIG. 5. The inverse calibration curve, approximated again by a lower order polynomial function, equation (2-4), is used as transformation to map measured pixel count values to temperatures.

$$T(I) \approx \sum_{k=0}^{m} c_k I^k \quad (2\text{-}4)$$

FIG. 4 shows a simulated mean camera response for a point source of TBC in the temperature range from 800 to 1400 K using a linear camera response function and the spectral sensitivity of the InGaAs detector in the Alpha camera from FLIR/Indigo. FIG. 5 shows the measured mean camera response using a TBC button sample located in a brick oven. An Alpha camera with an InGaAs FPA from FLIR was used as a sensor.

The parameters $c_k$ of the temperature estimation curve in equation (2-4) are estimated by minimizing the weighted mean square error, equation (2-5), between the measured calibration target temperature T and the observed non-uniformity corrected sensor response I, using n samples (i=1 ... n).

$$Q = \sum_{i=1 \ldots n} w_i \left( T_i - \sum_{k=0}^{m} c_k I_i^k \right)^2 \quad (2\text{-}5)$$

Figure 6:
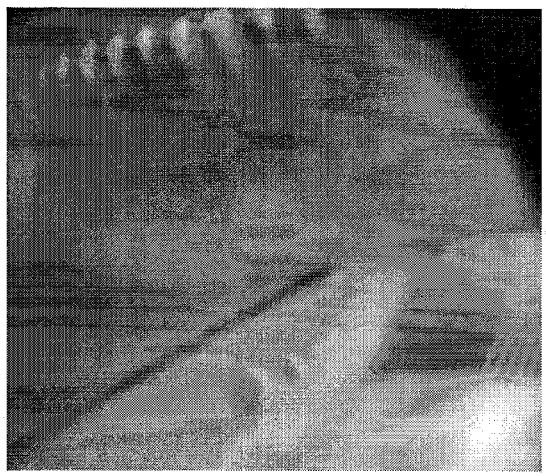
FIG. 6 is a grey scale image of a turbine blade.
Figure 7:
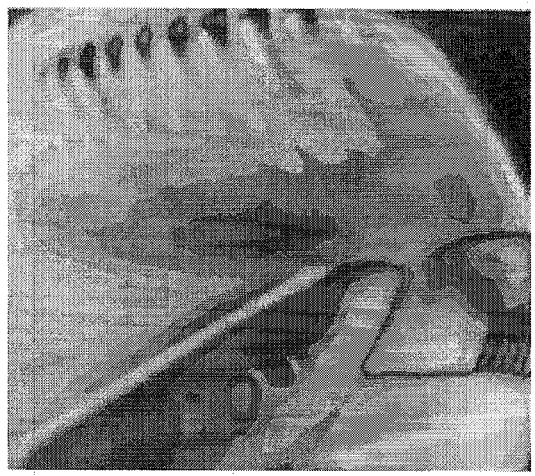
FIG. 7 is an isothermal plot with false colors of a turbine blade.

A small difference in the shape of the curve between the theory and the experimental result in FIGS. 4 and 5 can be explained by the non linear sensor response curve from the real InGaAs camera. The theoretical result is considering a linear sensor response curve only. More information about the calibration can be obtained from a technical report TR-05178 at Siemens Power Generation, Orlando. The online blade monitor system was used for direct surface temperature estimation of blades from an operating stationary gas turbine. Images are first non-uniformity corrected by using camera setting specific parameter sets $b_k(x, y)$. The NUC images are then transformed to temperature values using the inverse calibration curve equation (2-4). A calibration curve is valid for specific system setting such as filter type and sensor parameter including integration time. The temperature maps are then converted to false colors for better visualization. FIGS. 6 and 7 show images of the blade surface temperature. FIG. 6 is a grayscale image and FIG. 7 a corresponding isothermal plot in false colors.

Maximum Scene Temperature Estimation Using One Wave Band

The described maximum scene temperature estimation is derived from an upper temperature bound. Three different image formation models are considered: black body point source, gray body point source, gray body point source with reflection. Most realistic is the gray body model with reflection. The analysis shows how much a gray body point source model approximates the gray body point source model with reflection if maximum temperatures in the scene are of interest. The approximation errors for the gray body point source model and for the black body model are compared in detail. If the black body calibration curve in NIR is used for TBC blade temperature estimation, then maximum temperatures will be underestimated significantly by more then 100 Kelvin. Using a gray body calibration curve in NIR will systematically overestimate temperatures, but the estimation error decreases with higher scene maximum temperatures compared to the average environment temperature.

Upper Bound of Temperature Estimation

If $B(T,\lambda)$ is the Planck law spectral radiance and $S(s)$ the spectral sensitivity and collection of a sensor and lens as described in Richard D. Hudson, Jr. "Infrared System Engineering" John Wiley & Sons, New York, 1996, then the observed black body radiation (emissivity=1) in near-infrared is given by:

$$E_{Blackbody} = \int_{\lambda=900\,nm}^{\lambda=1700\,nm} S(\lambda) B(T, \lambda) d\lambda \quad (3\text{-}1)$$

The surface temperature (in equation 3-1) is described by T and the wavelength is denoted by $\lambda$. It is assumed in equation (3-1) and for the following argumentation, that the effect of the sensor viewing direction with respect to the surface normal can be ignored. This is a justified approximation for TBC, where the observed radiation is almost invariant to the viewing direction.

The observed radiation from a gray body point source, isolated from the environment, with a spectral surface emittance $\epsilon(\lambda)$ is given by:

$$E_{PointSource} = \int_{\lambda=900\,nm}^{\lambda=1700\,nm} S(\lambda) \epsilon(\lambda) B(T, \lambda) d\lambda \quad (3\text{-}2)$$

If the environment can not be ignored, then the observed radiation from a surface patch with incident radiation $E_1(\lambda)$ is given by:

$$E = \quad (3\text{-}3)$$
$$\int_{\lambda=900\,nm}^{\lambda=1700\,nm} S(\lambda) \epsilon(\lambda) B(T, \lambda) d\lambda + \int_{\lambda=900\,nm}^{\lambda=1700\,nm} S(\lambda)(1 - \epsilon(\lambda)) E_1(\lambda) d\lambda$$

The right integral in equation 3-3 is the observed radiated power due to reflection. Herein, the term $(1-\epsilon(\lambda))$ is the reflectance based on the assumption that no transmittance is involved. It is assumed, that the incident radiation is uniform or invariant to the surface normal orientation and the surface reflectance is Lambertian or invariant to the viewing direction. These are justified model assumptions for TBC because of the rough surface micro structure characteristic of TBC, and row 1 blades have a TBC environment. Since the reflected radiation is never negative, a lower bound of the observed radiation is given if the left term in equation (3-3) is ignored, by:

$$E \geq \int_{\lambda=900nm}^{\lambda=1700nm} S(\lambda)\varepsilon(\lambda)B(T,\lambda)d\lambda = E_{PointSource} \quad (3\text{-}5)$$

The lower bound on the measured radiation provides an upper bound of the surface temperature estimation. The error caused, by ignoring the incident radiation, depends on the intensity of the incident radiation compared to the thermal emittance for the patch. A model of the incident radiation would need to take into account the environment geometry, the environment temperature and the surface properties of the environment.

Model of Patch Irradiance Due to Reflection

The average scene radiance $E_0$ from an arbitrary surface patch can be approximated using the equilibrium, in which on average the surface radiance is equal to the mixture of the (gray body) thermal emittance $\varepsilon B_0$ and the irradiance from the environment $gE_0$ multiplied with the surface reflectance r. The approximated average scene temperature is denoted by $T_0$.

Average patch signal in scene:

$$E_0 = \varepsilon B_0 + grE_0 \quad (3\text{-}6)$$

$$E_0 = \frac{\varepsilon}{1-rg}B_0 \quad (3\text{-}7)$$

Replace reflectance $r=1-\varepsilon$, $$E_0 = \frac{\varepsilon}{1-g(1-\varepsilon)}B_0 \quad (3\text{-}8)$$

The incident radiation $E_1(\lambda)$ is then given by:

$$E_1(\lambda) = gE_0 = g\frac{\varepsilon(\lambda)}{1-g(1-\varepsilon(\lambda))}B(T_0,\lambda) \quad (3\text{-}9)$$

Equation (3-8) ignores material transmittance. Equation (3-6) requires a geometry factor g which is defined as the ratio of the area of the cavity that contributes to the irradiance $(A_{All}-A_{open})$ to the total surrounding area $A_{All}$.

$$g = \frac{A_{All} - A_{open}}{A_{All}} \quad (3\text{-}10)$$

The observed radiation from a patch described by equation (3-3) transforms with substitution from equation (3-9) into:

$$E = \int_{\lambda=900nm}^{\lambda=1700nm} S(\lambda)\varepsilon(\lambda)B(T,\lambda)d\lambda + \quad (3\text{-}12)$$

$$\int_{\lambda=900nm}^{\lambda=1700nm} S(\lambda)(1-\varepsilon(\lambda))\frac{g\varepsilon(\lambda)}{1-g(1-\varepsilon(\lambda))}B(T_0,\lambda)d\lambda$$

Equation (3-12) describes the observed radiation from a surface patch with temperature T and emissivity $\varepsilon(\lambda)$ in an environment with an average scene temperature $T_0$ and emissivity of $\varepsilon(\lambda)$, with an average effective visible surrounding area defined by the parameter g.

In case of uniform temperature $T=T_0$ equation (3-12) simplifies to the cavity $$\text{equation: } E = \int_{\lambda=900nm}^{\lambda=1700nm} S(\lambda)\varepsilon(\lambda)\left(1 + \frac{g(1-\varepsilon(\lambda))}{1-g(1-\varepsilon(\lambda))}\right)B(T_0,\lambda)d\lambda \quad (3\text{-}13)$$

For a total enclosed environment (cavity) with uniform temperature (g=1) equation (3-13) reduces to a black body source with an effective emissivity of one as is shown in the following equation.

$$\varepsilon(\lambda)\left(1 + \frac{1(1-\varepsilon(\lambda))}{1-1(1-\varepsilon(\lambda))}\right) = \quad (3\text{-}14)$$

$$\varepsilon(\lambda)\left(1 + \frac{1-\varepsilon(\lambda)}{1-1+\varepsilon(\lambda)}\right) = \varepsilon(\lambda) + 1 - \varepsilon(\lambda) = 1$$

This is consistent with results for cavities published by Gouffe and described in Richard D. Hudson, Jr. "Infrared System Engineering" John Wiley & Sons, New York, 1996. An open environment, described by g=0, transforms equation (3-13) into a point source with emissivity $\varepsilon(\lambda)$:

$$\varepsilon(\lambda)\left(1 + \frac{0(1-\varepsilon(\lambda))}{1-0(1-\varepsilon(\lambda))}\right) = \varepsilon(\lambda)(1+0) = \varepsilon(\lambda) \quad (3\text{-}15)$$

Simulation Results

Figure 8:
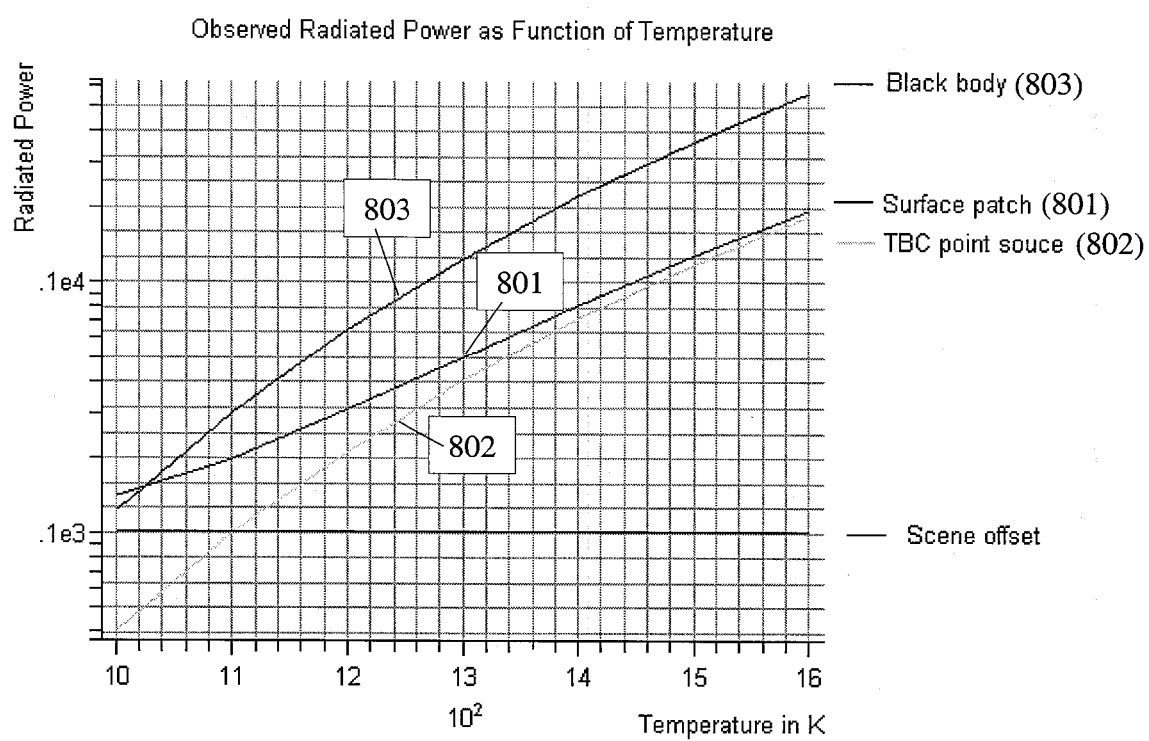
FIG. 8 is a graph illustrating observed radiation power as a function of temperature in accordance with an aspect of the present invention.

A simulation based on the black body point source equation (3-1), the gray body equation (3-2) and the gray body point source with reflection equation (3-12) with $T_0=1150K$, g=0.6 (g is a geometry factor) in near-infrared with TBC as a target, and InGaAs as detector in FIG. 8 shows, that the observed radiation from a surface patch with reflectance, according to equation (3-12), in curve 801, converges to the TBC gray body point source radiation (in curve 802) with higher surface temperatures ($T>T_0$).

FIG. 8 shows how the observed radiation from a surface patch with reflection (curve 801 in FIG. 8, equation (3-12) converges to the point source radiation curve 802 in FIG. 8, equation (3-2) with higher surface patch temperatures. Curve 803 in FIG. 8 shows observed radiated power from a black body source, equation (3-1).

If the surface patch temperature is smaller then the average scene temperature $T_0$ ($T<T_0$), then the observed radiated power will converge to the average scene radiation defined by the average scene temperature. In this case, the right integral of equation (3-3) is then more dominant.

Table 1 compares the real surface temperature with the estimated temperature values using a black body calibration curve derived from equation (3-1) and a gray body point calibration curve equation (3-2). It can be seen that the estimated temperature from the black body calibration curve is underestimating the real surface temperature at higher temperatures significantly, by more than 100K. The upper temperature estimation bond provides a more accurate estimate for higher temperatures. For a particular case, where the maximum temperature is about 150K higher than the average scene temperature, the maximum estimated temperature using the direct (black body model) temperature estimation is 130 Kelvin lower. The gray body temperature estimation method overestimates the temperature in this case by only 35 Kelvin.

TABLE 1

| | Real surface temperature | | | | | | |
|---|---|---|---|---|---|---|---|
| | 1000 K 727 C. | 1100 K 827 C. | 1200 K 927 C. | 1300 K 1027 C. | 1400 K 1127 C. | 1500 K 1227 C. | 1600 K 1327 C. |
| Apparent temperature using the direct one waveband method (black body model) | 1020 K 748 C. | 1050 K 877 C. | 1105 K 832 C. | 1170 K 897 C. | 1235 K 962 C. | 1305 K 1032 C. | 1370 K 1097 C. |
| Error of direct one waveband method | +20 K | −50 K | −95 K | −130 K | −165 K | −195 K | −230 K |
| Upper bound temperature estimate using a gray body point source as reference | 1159 K | 1190 K | 1260 K | 1335 K | 1425 K | 1520 K | 1610 K |
| Error of upper temperature bound | +150 K | +90 K | +60 K | +35 K | +25 K | +20 K | +10 K |
| T − T0 | −150 K | −50 K | 50 K | 150 K | 250 K | 350 K | 450 K |

Figure 9:
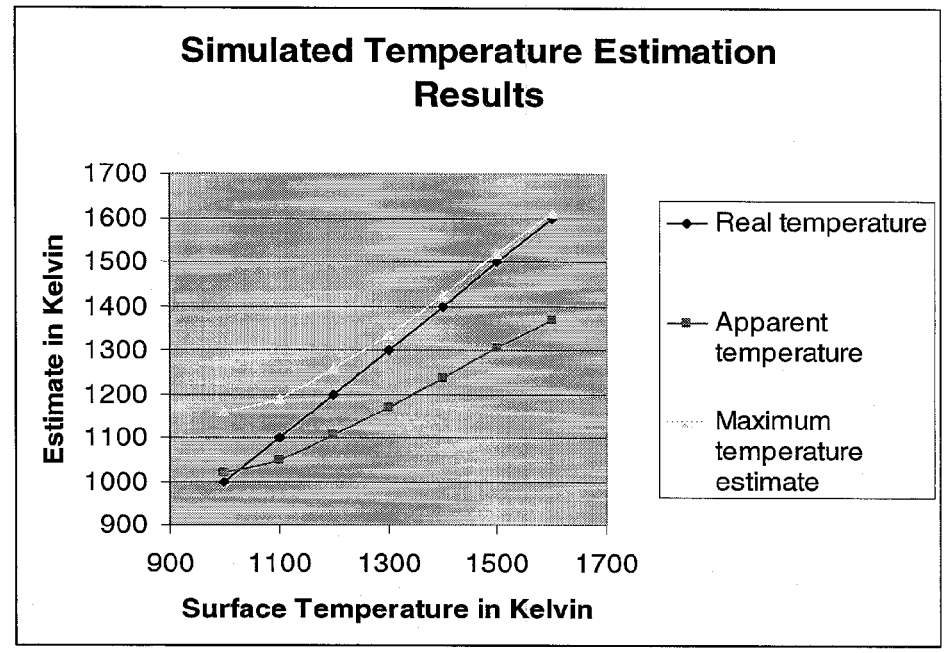
FIG. 9 is a graph comparing estimated temperatures with an actual temperature.

FIG. 9 provides a comparison of estimated temperatures using the direct one waveband method (apparent temperature) and the maximum temperature method. The direct one waveband method underestimates the real temperatures except for the lowest temperatures in the scene. The maximum temperature estimate is always higher than the real temperature with a decreasing error for higher relative scene temperatures.

Figure 10:
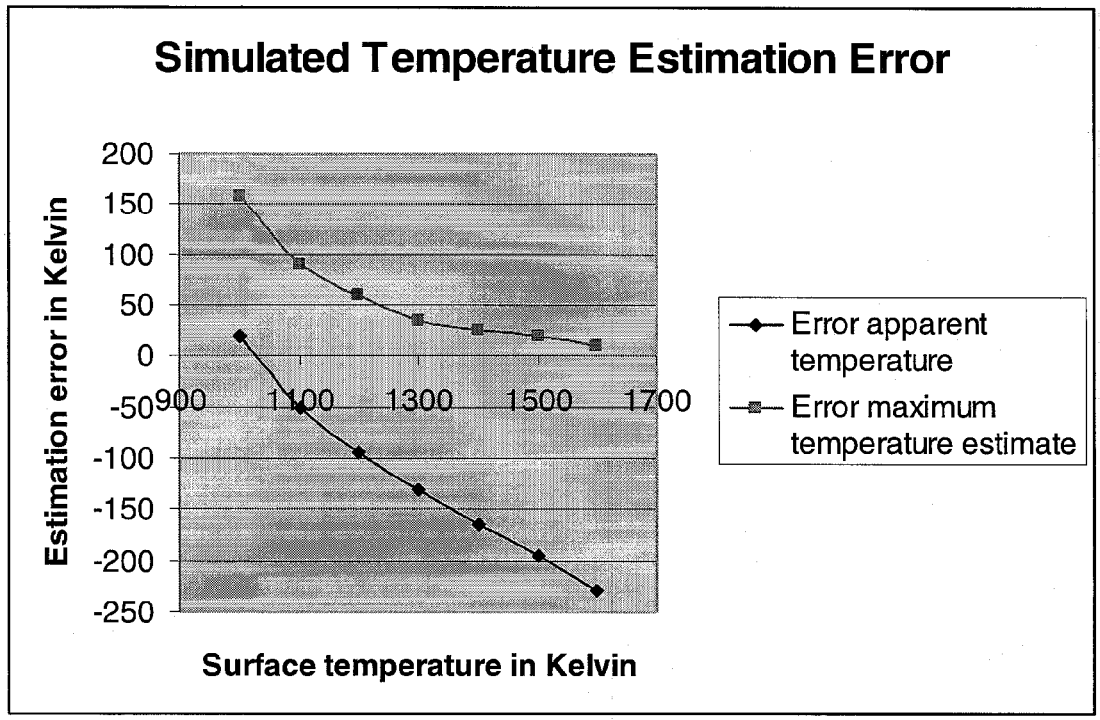
FIG. 10 is a graph comparing estimated temperature errors.

FIG. 10 provides a comparison of estimated temperature errors using the direct one waveband method (apparent temperature) and the maximum temperature method in the context of reflection. The direct one waveband method underestimates the real temperatures except for the lowest temperatures in the scene. The maximum temperature estimate is always higher than the real temperature with a decreasing error for higher relative scene temperatures.

Results on Real Data

The sensor system was calibrated using a TBC sample in a brick oven with controlled temperature. The measured irradiance on the sensor is a mixture of thermal emittance from TBC surface $\epsilon(\lambda)P(T_0,\lambda)$ and reflected radiation form the brick surrounding $(g(1-\epsilon(\lambda))\epsilon_{brick}(\lambda))P(T_0,\lambda)$. The measured irradiance on the sensor is then given by:

$$I = \int_{\lambda=900nm}^{\lambda=1700nm} S(\lambda)(\epsilon(\lambda) + g(1 - \epsilon(\lambda))\epsilon_{brick}(\lambda))P(T_0, \lambda)d\lambda \quad (3\text{-}16)$$

The geometry factor g is defined by the size of the opening on the brick oven and the distance of the TBC sample to the opening. In this case the geometry factor is set to g=0.9. The emissivity of TBC is set to e=0.35 and the emissivity of brick is set to $\epsilon_{brick}(\lambda)=0.92$. The effective emissivity $e'(\lambda)$ of TBC in the oven is then given by:

$$\epsilon'(\lambda)=\epsilon(\lambda)+g(1-\epsilon(\lambda))\epsilon_{brick}(\lambda)=0.89 \quad (3\text{-}17)$$

The recorded sensor calibration curve is based on an effective emissivity of 0.89 and can be converted to the corresponding TBC point source calibration curve with emissivity 0.35 as required for the maximum temperature estimation using a conversion factor p:

$$I_{TBC\_PointSource} = pI, \text{ with } p = \frac{0.35}{0.89} \quad (3\text{-}18)$$

$$I_{TBC\_PointSource} = \frac{0.35}{0.89}\int_{\lambda=900nm}^{\lambda=1700nm} S(\lambda)0.89P(T_0,\lambda)d\lambda =$$

$$= \int_{\lambda=900nm}^{\lambda=1700nm} S(\lambda)0.35P(T_0,\lambda)d\lambda$$

The conversion factor can be setup in the temperature estimation dialog of the BladeInspector software with a radiance gain parameter:

$$\text{radiance gain}=1/p=2.54 \quad (3\text{-}19)$$

Figure 11:
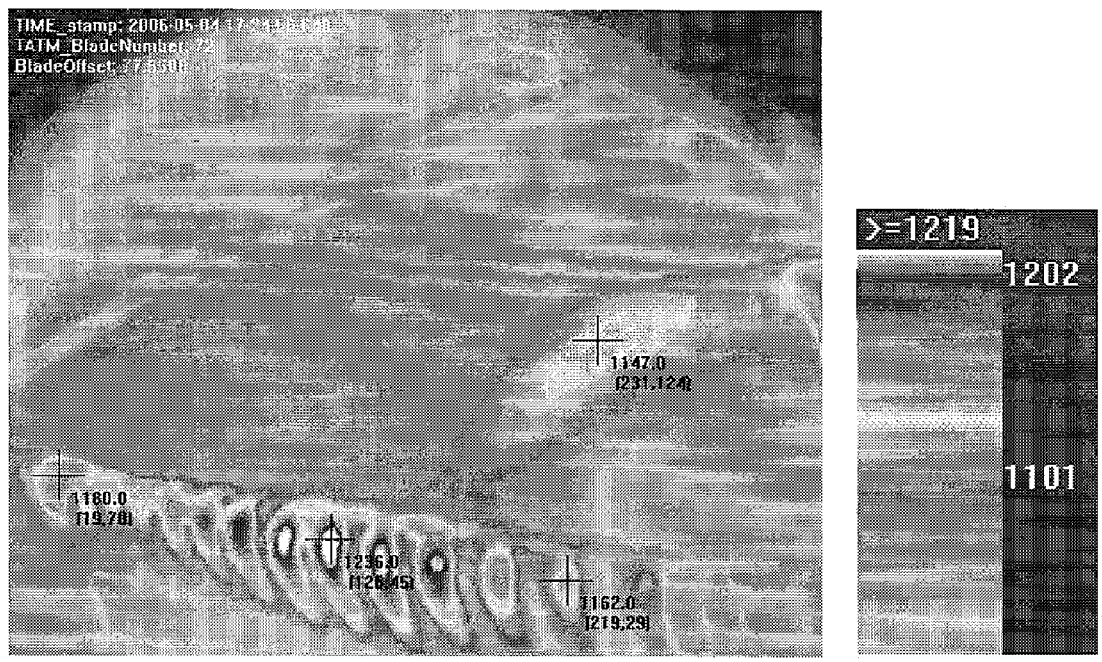
FIG. 11 is an example of temperature estimation in accordance with an aspect of the present invention.

An example of the measured temperature using the maximum temperature method is given in FIG. 11. FIG. 11 provides an example of temperature estimation using the maximum temperature estimation method. The simulation in Table 1 shows that the estimated temperatures are still about 35K too high.

In this case the TBC gray body calibration curve is appropriated for maximum temperature estimation, because the average scene temperature is about 150K lower compared to the scene maximum temperature and the spot size area with the highest temperatures are small compared to the total area. A similar temperature distribution for vanes, where the maximum temperature is 150K higher than the average temperature was also reported by Markham in J. Markham, H. Latvakoski, D. Marran, J. Neira, P. Kenny, P. Best "Challenges of Radiation Thermometry for Advanced Turbine Engines" Proceedings of the 46th International Instrumentation Symposium, ISA Volume 397, 2000. It can be expected, for this particular temperature estimation case, that the estimated maximum temperature is still overestimated by 35K as indicated by the numerical analysis. The 35 Kelvin may be subtracted from the maximum temperature based on simulation results to increase the accuracy.

It is another aspect of the present invention to adjust a calibration curve of estimated temperatures derived from one waveband optical measurements by a factor that is dependent on a radiation model. It was demonstrated how the radiation model such as black body or grey body assumptions can create systematic estimation errors in a calibration curve.

Accordingly it is an aspect of the present invention to correct estimated temperatures based on applied radiation models in creating calibration curves.

As an aspect of the present invention, and as was shown above, a temperature can be estimated by applying a calibration or an inverse calibration. As an illustrative example means for calibration are provided as a calibration curve. Means of calibration, as an aspect of the present invention, can be provided in different forms. For instance a means for calibration can be provided as a curve, as a table, as a formula, as a calibration factor, as a calibration correspondence or in any other form that is useful to apply calibration for estimating a temperature. A processor, in accordance with another aspect of the present invention, can use this calibration information in whatever form presented to determined temperatures and other information.

System

Figure 12:
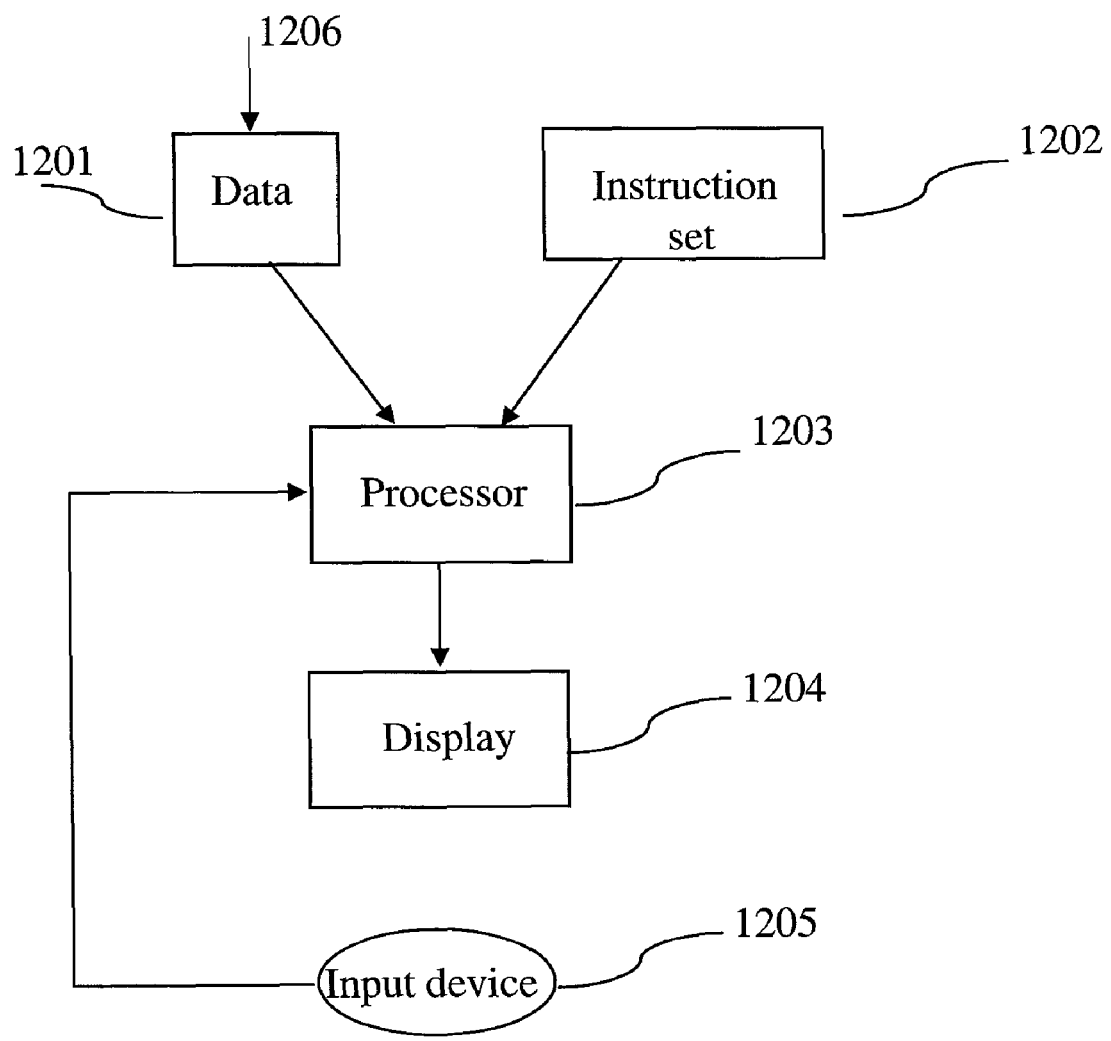
FIG. 12 illustrates a computer system that is used to perform the steps described herein in accordance with an aspect of the present invention.

The temperature estimation and error calibration methods that are aspects of the present invention can be executed by a system as shown in FIG. 12. The system is provided with data 1201 representing image data. Image data may be provided on an input 1206. Such data may be provided on for instance a continuous basis. It may also be provided as samples. An instruction set or program 1202 executing the methods of the present invention is provided and combined with the data in a processor 1203, which can process the instructions of 1202 applied to the data 1201. An image or an alert or any other signal resulting from the processor can be outputted on a device 1204. Such a device for instance can be a display. It can for instance provide a false coloring temperature map of a turbine blade. However in operational situation such device may also be an output device to provide an alert or for instance provide input to a control system. The processor can be dedicated hardware. However, the processor can also be a CPU or any other computing device that can execute the instructions of 1202. An input device 1205 like a mouse, or track-ball or other input device may be present to allow a user to select an initial object or for instance to select a preferred calibration curve. The input device may also be used to start or stop instructions on the processor. However such an input device may also not be present. Accordingly the system as shown in FIG. 12 provides a system for temperature estimation using methods disclosed herein.

The following references are generally descriptive of the background of the present invention and are hereby incorporated herein by reference: [1] Technical report: TR-05178 at Siemens Power Generation, Orlando. [2] R. M. Haralick and L. G. Shapiro. Computer and robot vision, vol. 2, New York, Addison Wesley, 1993. [3] Richard D. Hudson, Jr. "Infrared System Engineering", John Wiley & Sons, New York, 1996. [4] M. Voigt, M. Zarzycki, D. LeMieux, V. Ramesh, "Scene-based nonuniformity correction for focal plane arrays using a facet model", Proceedings of the SPIE "Infrared Technology and Applications XXXI, Volume 5784, pp. 331-342 (2005). [5] T. Schulenberg, H. Bals, "Blade Temperature Measurement of Model V84.2 I00 MW/60 Hz Gas Turbine", Gas Turbine Conference and Exhibition, Anaheim, Calif., May 31-Jun. 4, 1987, [6] J. Markham, H. Latvakoski, D. Marran, J. Neira, P. Kenny, P. Best "Challenges of Radiation Thermometry for Advanced Turbine Engines" Proceedings of the 46th International Instrumentation Symposium, ISA Volume 397, 2000 [7] Beynon, T. G. R., 1981, "Turbine Pyrometry An Equipment Manufacturer's View" SME 81-GT-136.

While there have been shown, described and pointed out fundamental novel features of the invention as applied to preferred embodiments thereof, it will be understood that various omissions and substitutions and changes in the form and details of the system and methods illustrated and in its operation may be made by those skilled in the art without departing from the spirit of the invention. It is the intention, therefore, to be limited only as indicated by the scope of the claims appended hereto.

The invention claimed is:

1. A method for temperature estimation of a surface of a body, comprising:
   receiving an image of the body with a sensor;
   providing the image to a processor to remove sensor specific non-uniformities to create a corrected image having a plurality of pixels from the image, each of the plurality of pixels having a pixel value;
   transforming the pixel value for each of the plurality of pixels in the corrected image into an estimated temperature value by using a polynomial function of pixel values;
   correcting the estimated temperature value for each of the plurality of pixels using a model expressed by:

$$E = \int_{\lambda=\lambda_1}^{\lambda=\lambda_2} S(\lambda)\varepsilon(\lambda)B(T,\lambda)d\lambda + \int_{\lambda=\lambda_1}^{\lambda=\lambda_2} S(\lambda)(1-\varepsilon(\lambda))\frac{g\varepsilon(\lambda)}{1-g(1-\varepsilon(\lambda))}B(T_0,\lambda)d\lambda,$$

wherein E represents a radiation, $\lambda$ represents a wavelength of radiation received by a sensor element of the sensor, S represents a spectral sensitivity, B represents a Planck law spectral radiance and g is a geometry factor; and
   displaying the estimated temperature value for each of the plurality of pixels.

2. The method as claimed in claim 1, wherein the body is a part in a hot gas path of a gas turbine with reflective surface properties.

3. The method as claimed in claim 1, wherein a waveband of wavelengths $\lambda 1$ to $\lambda 2$ is within the waveband of infrared radiation.

4. The method as claimed in claim 3, wherein $\lambda 1$ is essentially 900nm and $\lambda 2$ is essentially 1700nm.

5. The method as claimed in claim 4, wherein the model is based on a grey body radiation model with $\varepsilon(\lambda)<1$.

6. A system for temperature estimation of from a surface of a body, comprising:
   an infrared imagery sensor;
   a display;
   a processor that receives an image of the body from the infrared imagery sensor;
   software operable on the processor to process the image by:
      removing sensor specific non-uniformities to create a corrected image having a plurality of corrected pixels from the image, a pixel having a pixel value;
      transforming a pixel value for each of the plurality of corrected pixels into an estimated temperature value by using a polynomial function of pixel values;
      correcting the estimated temperature value for each of the plurality of pixels using a model expressed by:

$$E = \int_{\lambda=\lambda_1}^{\lambda=\lambda_2} S(\lambda)\varepsilon(\lambda)B(T,\lambda)d\lambda + \int_{\lambda=\lambda_1}^{\lambda=\lambda_2} S(\lambda)(1-\varepsilon(\lambda))\frac{g\varepsilon(\lambda)}{1-g(1-\varepsilon(\lambda))}B(T_0,\lambda)d\lambda,$$

wherein E represents a radiation, $\lambda$ represents a wavelength of radiation of radiation received by a sensor element of the sensor. S represents a spectral sensitivity, B represents a Planck law spectral radiance and g is a geometry factor; and displaying the estimated temperature value on the display.

7. The system as claimed in claim 6, wherein the body is a part in the hot gas path of a gas turbine with reflective surface properties.

8. The system as claimed in claim 6, wherein a waveband of wavelengths $\lambda 1$ to $\lambda 2$ is within the waveband of infrared radiation.

9. The system as claimed in claim 8, wherein $\lambda 1$ is essentially 900nm and $\lambda 2$ is essentially 1700nm.

10. The system as claimed in claim 9, wherein the model is based on a grey body radiation model with $\epsilon(\lambda)<1$.

* * * * *